United States Patent
Dooner et al.

(10) Patent No.: US 6,263,571 B1
(45) Date of Patent: Jul. 24, 2001

(54) TOOTHED GEAR DESIGN AND MANUFACTURING METHOD

(76) Inventors: David B. Dooner, P.O. Box 109, Quincy, FL (US) 32351; Ali A. Seireg, 219 DuRose Ter., Madison, WI (US) 53705

( * ) Notice: Subject to any disclaimer, the term of this patent is extended or adjusted under 35 U.S.C. 154(b) by 0 days.

(21) Appl. No.: 09/064,045

(22) Filed: Apr. 21, 1998

Related U.S. Application Data

(63) Continuation of application No. 08/349,562, filed on Dec. 5, 1994, now abandoned.

(51) Int. Cl.[7] .......................................................... B23F 9/00
(52) U.S. Cl. ............................. 29/893.35; 409/26; 409/51; 451/47
(58) Field of Search .................................. 409/26, 27, 10, 409/11, 12, 13, 28, 29, 30, 38, 50, 51, 52, 37; 451/11, 47, 219; 29/893.35, 893.3

(56) References Cited

U.S. PATENT DOCUMENTS

| | | | |
|---|---|---|---|
| 1,705,887 | * 3/1929 | Wildhaber | 409/26 |
| 3,891,407 | * 6/1975 | Kotthaus | 451/47 |
| 4,050,353 | * 9/1977 | Bachmann et al. | 409/28 |
| 4,184,796 | * 1/1980 | Sakai et al. | 409/12 |
| 4,611,956 | * 9/1986 | Kotthaus | 409/26 |

(List continued on next page.)

FOREIGN PATENT DOCUMENTS

| | | |
|---|---|---|
| 0 023 983 | 7/1980 | (EP) . |
| 373851 | 6/1932 | (GB) . |

OTHER PUBLICATIONS

"Manufacture of Toothed Bodies," Chapter 5 pp 214–217 257, 258 *The Kinematic Geometry of Gearing* copy in 409–410, Feb. 1995.*
Bottema, O., and Roth B., *Theoretical Kinematics,* Chapter 6, North–Holland Publishing Co., Amersterdam, 1979, p. 161.

(List continued on next page.)

*Primary Examiner*—William Briggs
(74) *Attorney, Agent, or Firm*—Allen, Dyer, Doppelt, Milbrath & Gilchrist, P.A.

(57) ABSTRACT

A method of gear design perfects design of gear teeth geometry (30) instead of limiting gear-tooth design to present cutter geometry and manufacturing methods. A pair of varied-diameter cutters (22, 29), such as hypoid cutters, have a geometric form that generates variable diameter toothed elements. Structures of hypoid or other varied-diameter cutters are achieved with a cutting tool (9) having a design cross-sectional shape of an idealized space between gear teeth on both of a pair of cutters. The cutter tool is rotated and reciprocated in shaping or machining relationship to other cutter blanks (18) or workpiece (10) in design rotation on cutter axes of a cutting-machine spindle (5). The cutter axes have variable heights above the cutter tool. Simultaneously with shaping or machine cutting either cutter blank, the angle of reciprocation and linear positioning of the cutter tool and height of center of the cutter axes are varied designedly. Appropriate cutting edges (33, 34) are then formed on or attached to the varied-diameter cutter so formed. Pairs of gear blanks are then cut to perfected gear form by the pair of varied-diameter cutter tools. The same method and machine used for making varied-diameter cutters can be employed for cutting gears (26, 27, 28) directly. The machine can also be used to manufacture dies or molds to produce toothed bodies. The method is based on general new mathematical formulations for conjugate surfaces in space for any motion or load transmission between generally oriented axes.

14 Claims, 9 Drawing Sheets

U.S. PATENT DOCUMENTS

| | | | |
|---|---|---|---|
| 4,649,671 | * | 3/1987 | Erhardt et al. ............... 451/219 X |
| 4,650,378 | * | 3/1987 | Zubler ............................... 409/12 |
| 4,694,617 | * | 9/1987 | Loos et al. ..................... 409/37 X |
| 4,757,644 | * | 7/1988 | Erhardt et al. ..................... 451/11 |
| 4,776,137 | * | 10/1988 | Loos et al. ......................... 451/47 |
| 4,981,402 | * | 1/1991 | Krenzer et al. ............... 409/27 X |
| 5,116,173 | | 5/1992 | Goldrich . |
| 5,325,634 | * | 7/1994 | Kobayashi et al. ........... 409/38 X |
| 5,456,558 | * | 10/1995 | Horiuchi ........................... 409/26 |

OTHER PUBLICATIONS

Hunt, K. H., *Kinematic Geometry of Mechanisms,* Clarendon Press, Oxford, 1978, p. 89.

Dooner, David B. and Seireg, Ali A., A Kinematic Geometry Of Gearing, A Concurrent Engineering Approach, Manufacturing Competitiveness Frontiers, Jul. 1995.

Dooner, David B. and Seireg, Ali A., A Kinematic Geometry of Gearing, A Concurrent Engineering Approach, Mech. Rev., vol. 48, No. 7, Jul. 1995.

\* cited by examiner

TOOTHED GEAR DESIGN AND MANUFACTURING METHOD

CROSS REFERENCE TO RELATED APPLICATION

This application is a continuation of application Ser. No. 08/349,562 filed Dec. 5, 1994 to be abandoned.

FIELD OF THE INVENTION

This invention relates to toothed elements and their manufacture. In particular, it relates to optimize design methods and machinery for manufacture of toothed gears and gear cutters, molds or dies without limitation to cylindrical or conical surface geometry of present gear-making machinery and related methods.

Gear efficiency, use-life and noise are affected by efficiency of conjugal engagement of gear teeth. Limitations on conjugate action in conventional gears result primarily from: (a) imperfect geometric structure of gear teeth and spaces between teeth necessitated by known gear-cutting hobs and milling machines, and (b) imperfections in gear-tooth surfaces that result from conventional hobbing and machining methods. In turn, imperfection of geometric structure of gear surfaces results from conventional geometry of hobbing tools and use of the same geometry in milling machines for cutting gear teeth. Since their inception about 150 years ago, hobs and the forms of gears they cut, whether these forms are cut with hobs or with milling machines directly, have been considered so preferable that major improvement on them or better gear-making means for making better gears have not occurred until this invention.

Present gear-tooth manufacture starts with analysis of limitations based on capabilities of present hobs and production machines and stays within these parametric limitations. With this invention, gear-tooth manufacture starts with analysis of geometry for optimization of gear-tooth contact for particular use conditions, proceeds to construction of a cutting tool that can cut the optimized geometry and then cuts the optimized gear-tooth geometry to provide far superior gears. For all types and forms of geared-tooth bodies, the optimized gear geometry can result in relative geometric perfection of gear teeth that increase efficiency, last longer and make less noise.

Some machines and methods have been devised to improve, to replace or to supplement present hobbing and milling of gears. But they have neither addressed nor solved basic structural problems with present gears, gear-making methods and gear-making equipment.

Examples of machines, methods and products of manufacture which are different than taught by this invention but related are described in the following patent documents. U.S. Pat. No. 4,981,402, issued to Krenzer et al. on Jan. 1, 1991, taught a computer-controlled machine for cutting bevel and hypoid gears without overcoming basic geometrical flaws of hobbing tools. Krenzer's machine yields substantially the same structural gear forms cut by hobbing tools but with a reduction of surface imperfections caused by essential hobbing practices. U.S. Pat. No. 5,116,173, issued to Goldrich on May 26, 1992, described a method for utilizing machinery taught by the Krenzer et al. patent and other machinery having similar capabilities. U.S. Pat. No. 5,228,814, issued to Suwijin on Jul. 20, 1993, disclosed a hobbing machine that decreased shift in hobs but did not eliminate hobs or change their structure to overcome geometrical limitations of hobbing tools. U.S. Pat. No. 4,038,732, issued to Hunkeler on Aug., 2, 1977, taught a large face-mill cutting tool for making large-diameter gears, but perpetuated geometrical problems of both milling and hobbing of gears. Other known prior art is not sufficiently related or similar for comparison.

SUMMARY OF THE INVENTION

In light of problems that have existed and that continue to exist in this field, objects of this invention are to provide a design and manufacturing method for toothed bodies and a manufacturing process which:

Provide optimum gear-tooth design for all types of toothed bodies;

Provide methods for making gear-tooth cutters for all optimum gear teeth;

Maximize efficiency and use life of all types and forms of gear teeth;

Minimize noise of all types and forms of gears and gear pairs;

Provide methods for manufacturing idealized geometry of all types of toothed bodies;

Provide special machinery and tools for manufacturing conjugate action gears with idealized geometry of gear teeth;

Provide method for design of variable diameter gears with idealized geometry of gear teeth;

Utilize newly developed mathematical laws governing movement of a cutter relative to a work piece to ensure conjugate relation of motion between gears of a manufactured gear pair. These mathematical laws define the necessary relationships between the tooth pitch, pressure angle and spiral angle for optimized surface geometry;

Provide means and method for compensating for anticipated errors in manufacturing, assembly and operations of the gears;

Provide means for design and manufacture of spiral non-circular gear pairs having varied spiral angle for optimized conjugate motion;

Provide a varied-diameter cutter that is designed and manufactured to produce tooth surfaces with wide variations of sizes;

Provide a preferred embodiment of a hypoid cutter pair as a means for varying diameter or pitch of idealized hypoid gear pairs;

Provide a mold or die designed and manufactured for production of an optimized gear pair;

Enable a wide variety of functional relationship between input and output motions of gear bodies;

Accommodate errors and misalignment in design and manufacture for improved contact and noise reduction;

Allow design and manufacture of a wide variety of spiral non-circular gear pairs;

Allow selection of any number of teeth from one to large numbers; and

Allow wide flexibility in face width, shaft angle, center distance, pressure angle and tooth geometry for all types and forms of gear sets.

This invention accomplishes the above and other objectives with a method of gear design which perfects design of gear teeth instead of limiting gear-tooth design to present cutter geometry and manufacturing methods. A pair of varied-diameter cutters, such as hypoid cutters, are structured with a cutter having a geometric form that generates a perfected gear-tooth design as an example. Structures of the hypoid or other varied-diameter cutters are achieved with a cutter tool having a design cross-sectional shape of an idealized space between gear teeth on both of a pair of cutters. The cutter tool is reciprocated in shaping or machining relationship to hyperboloidal or other cutter blanks in design rotation on cutter axes. The cutter axes have variable heights above the cutter tool. Simultaneously with shaping or machine cutting either cutter blank, angle of reciprocation of the cutter tool and height of center of the cutter axes are varied designedly. Appropriate cutting edges are then formed on or attached to the varied-diameter cutter so formed. Pairs of gear blanks are then cut to perfected gear form by the pair of varied-diameter cutter tools. The same method and machine used for making varied-diameter cutters can be employed for cutting gears directly.

An apparatus of the present invention comprises a numerically controlled milling machine useful in forming variable diameter toothed gear pairs. The milling machine includes a frame, a headstock carriage carried by the frame and controllable for vertical travel on a head-frame face of the head frame, a machine spindle for carrying a workpiece, the machine spindle extending horizontally from the headstock carriage and operable for selectively controllable rotation of the workpiece, a cradle rotatably carried by the frame, and a machine carriage moveably carried by the cradle, the machine carriage controllable for rotational and reciprocal movement. Further, cutting tool holding means are carried by the machine carriage for holding a cutting tool therein during cutting contact with the workpiece, and control means are provided for numerically controlling operation of the milling machine in response to a preselected control input. The input includes cutting tool movement commands for providing a conjugate movement between toothed gears of a toothed gear pair to be manufactured.

A method aspect of the present invention includes a method for manufacturing a toothed gear pair, each toothed gear having a variable diameter and variable pitch for providing a conjugate action therebetween. The method includes the steps of providing a numerically controlled milling machine having a frame, a machine spindle having selectively controllable rotation for rotatably carrying a workpiece to be machined, a carriage moveably carried by the frame for rotation and reciprocation thereof with simultaneous rotation of the workpiece, and a cutter carried by the carriage for cutting the workpiece in response to a preselected control input, and providing a preselected control input to the numerically controlled milling machine, which input includes cutter movement commands for providing a conjugate movement between toothed gears of a toothed gear pair to be manufactured. A first variable diameter shaped workpiece is mounted on the machine spindle of the milling machine for rotation about an axis, the first variable diameter shaped workpiece having a minor diameter end and an axially opposing major diameter end. One groove is cut into the first variable diameter shaped workpiece by reciprocating and rotating the cutter, while simultaneously rotating the first variable diameter shaped workpiece about the axis in response to the preselected control input for providing a groove which extends along the surface of the first variable diameter shaped workpiece between the minor and major diameter ends. The first variable diameter shaped workpiece is then rotated about the axis by one circular pitch, in response to the preselected control input for providing a preselected number of teeth. The groove cutting and rotating steps are repeated for forming a first variable diameter gear-forming tool having the preselected number of teeth positioned between the grooves and extending from the minor to major diameter ends thereof, each of the teeth having a forming edge thereon, each of the teeth curved radially and axially outward while changing in pitch from the minor diameter end to the major diameter end. The first variable diameter gear-forming tool is then removed from the milling machine. A second variable diameter shaped workpiece in mounted on the machine spindle and similar forming steps are performed based on the preselected control input to fabricate a second variable diameter gear-forming tool. The first and second gear-forming tools are then used to form first and second variable diameter gears in response to the control input, thus providing a toothed gear pair. In one embodiment, the first and second gear-forming tools are operable with a hobbing machine for forming the gear pair. In yet another method aspect of the present invention, the first and second toothed gears of the gear pair are formed using the numerically controlled milling machine as are the gear-forming tools. As will be described, one desirable variable diameter gear pair includes a hyperboloidal gear pair.

BRIEF DESCRIPTION OF THE DRAWINGS

This invention is described by appended claims in relation to description of a preferred embodiment with reference to the following drawings which are described briefly as follows:

DESCRIPTION OF PREFERRED EMBODIMENTS

Figure 1:
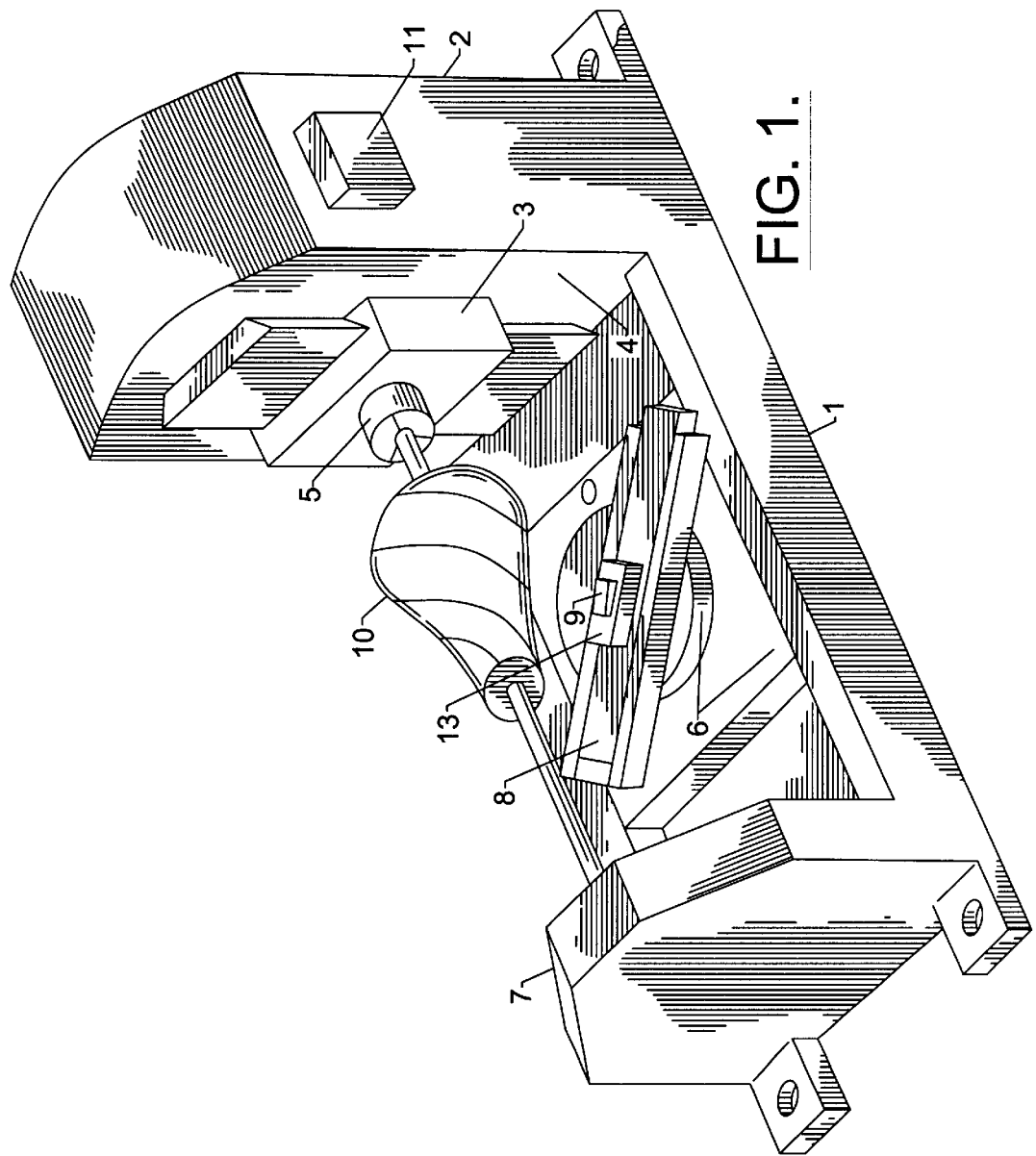
FIG. 1 is a perspective view of a machine according to this invention for cutting teeth on a toothed body for either making a cutting tool to manufacture a gear set with optimized conjugate action or to manufacture directly a gear set with optimized conjugate action or a mold or die for casting. A hyperboloidal gear form is shown in relation to the machine as an example of gear forms made possible by the method and the machine of this invention.

Reference is made first to FIG. 1. A machine frame 1 has a head frame 2 extended vertically upward from a headstock end of the machine frame 1. A headstock carriage 3 is positioned with controllable vertical travel on a head-frame face 4 of the head frame 2. A cutting-machine spindle 5 having selectively controllable rotation is extended horizontally from the headstock carriage 3. A machine cradle 6 is rotatable in a horizontal plane and moveable linearly parallel to an axis of the cutting-machine spindle 5 proximate a top surface of the machine frame 1 intermediate a tailstock member 7 and the head frame 2. A rotative and reciprocative machine carriage 8 is positioned on the machine cradle 6.

A cutting tool 9 positioned on the rotative and reciprocative machine carriage 8 is rotated and reciprocated by the machine carriage 8 in shaping relationship to a workpiece 10 positioned in the cutting-machine spindle 5. Simultaneously, the machine cradle 6 is varied in distance from the head frame 2 and the rotative and reciprocative machine carriage 8 is rotated selectively while the cutting-machine spindle 5 is being rotated and varied in height selectively. All machine motion can be computer controllable from a control panel 11 positioned as desired.

With this working relationship of parts for a combined directional cutting travel, the workpiece 10 can be hyperboloidal as illustrated. Cuts in the workpiece can form gear teeth and leave spaces between gear teeth with any surface geometry. The forms generated can be structured as either toothed-gear bodies or as gear-cutter tools to cut toothed-gear bodies. The toothed-gear bodies generated directly by the cutting tool 9 or by a gear-cutter tool structured from the workpiece 10 can have total working-contact without the non-working contact necessitated by limitations of present machinery and related methods for hobbing and machining of present gears of any form. Improvement of efficiency, use-life and quietness of gears manufactured accordingly is revolutionary in comparison to gears manufactured with present hobbing and machining machinery and related methods.

Figure 2:
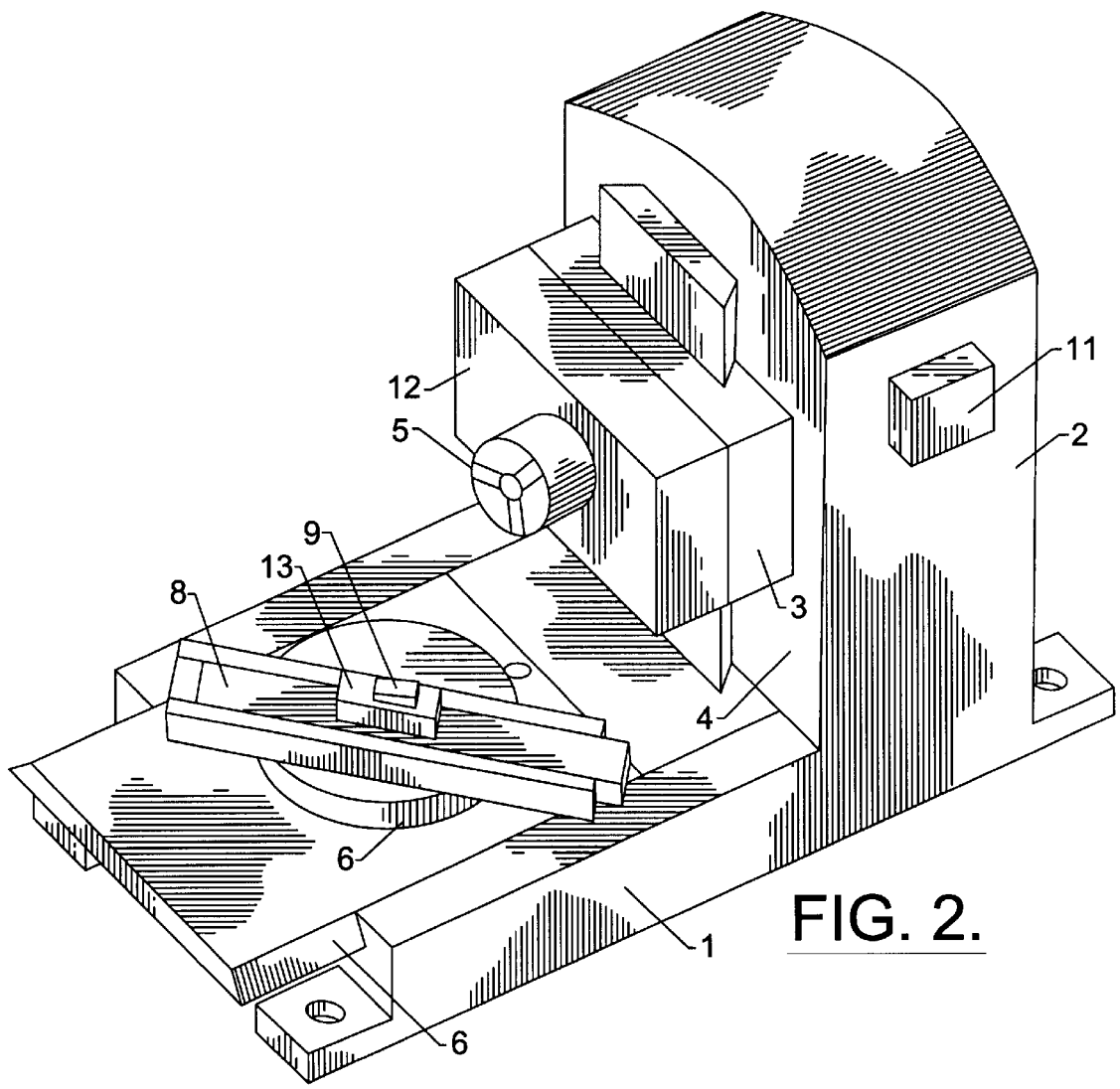
FIG. 2 is a modification of the FIG. 1 machine without a tail stock for allowing free vertical travel of a workpiece in relation to a shaping cutter having reciprocal travel with variable horizontal and rotational positioning perpendicularly to an axis of the workpiece.

Referring to FIGS. 1–2, the tailstock member 7 shown in FIG. 1 can be eliminated if the cutting-machine spindle 5 is provided with sufficient grasping capacity and if the workpiece 10 shown in FIG. 1 is not long enough to need tailstock support for rigidity. A computer-controlled rotational means 12 can be provided with sufficient rigidity and accuracy for cutting most gears that are relatively short from-face-to-face. Various forms of tool-holding means 13 can be provided for positioning various forms of the cutting tool 9 on the rotative and reciprocative machine carriage 8.

Figure 3:
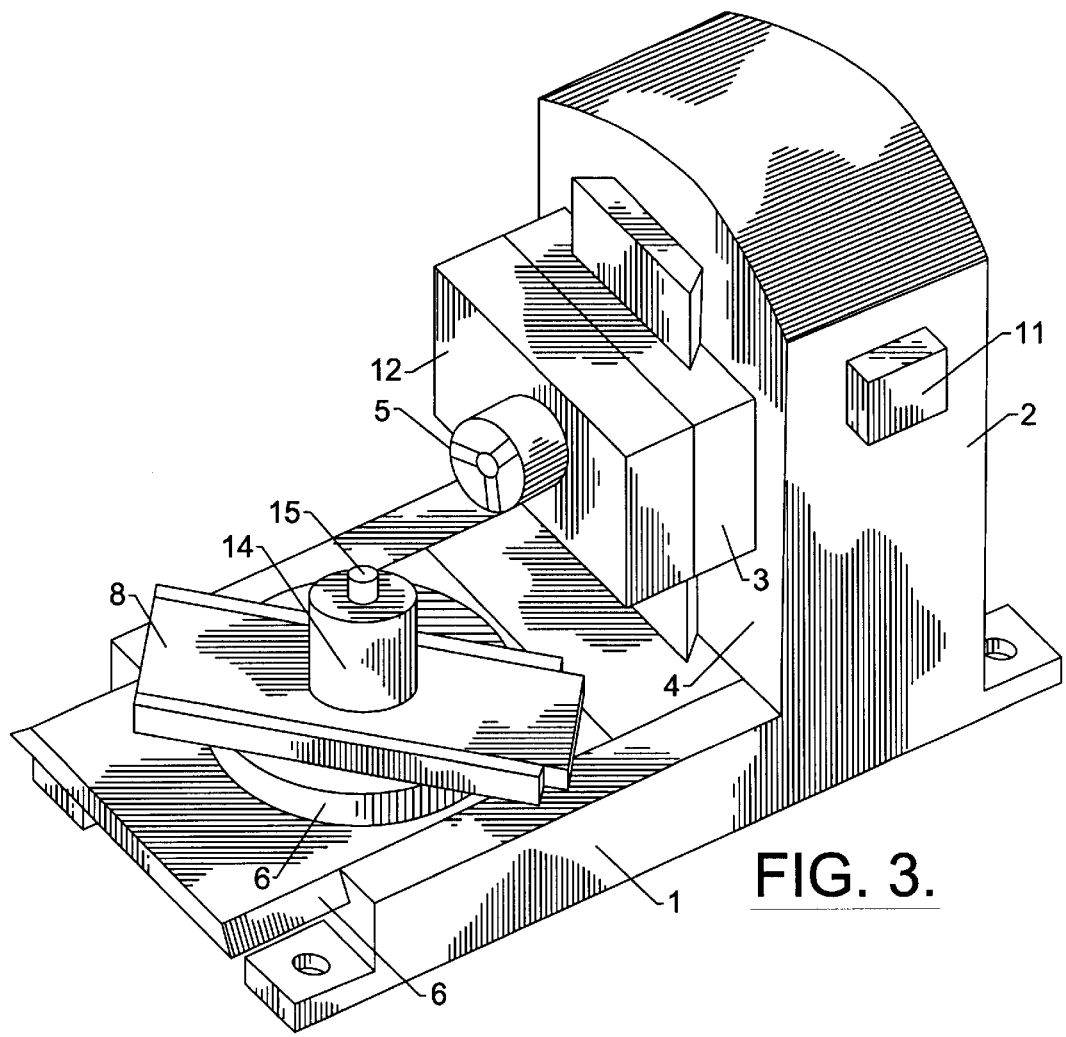
FIG. 3 is a modification of the FIG. 2 machine having a rotational milling cutter in place of the shaping cutter.

Referring to FIGS. 1–3, the tool-holding means 13 shown in FIGS. 1–2 can be a rotative spindle 14 extended vertically from the rotative and reciprocative machine carriage 8 as depicted in FIG. 3. The rotative spindle 14 can include a computer-controlled motor for rotating a milling cutter 15. While the milling cutter 15 rotates, the rotative spindle 14 travels similarly to selectively directional reciprocative travel of the cutting tool 9, as described in relation to FIGS. 1–2, and height of the headstock carriage 3 is varied selectively. This provides a milling action for cutting gears and gear-cutting tools with features similar to those cut with the cutting tool 9.

Figure 4:
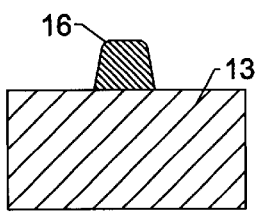
FIG. 4 is a cross-sectional view of a shaping-machine bit having a size and form approximately equal to a space between gear teeth for use on the FIGS. 1–2 machines.
Figure 5:
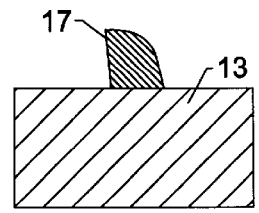
FIG. 5 is a cross-sectional view of a shaping-machine bit having a size and form approximately equal to a select portion or point of a space between gear teeth for use on the FIGS. 1–2 machines.

Referring to FIGS. 1–6, the cutting tool 9 shown in FIGS. 1–2 can be a cross-sectional cutter 16 that approximates a design space between teeth as depicted in FIG. 4. A workpiece 10 can be cast or otherwise preformed to provide rough teeth for finish manufacture of some types of gears with the cross-sectional cutter 16. For gears requiring forging, rolling or other strengthen-hancing processing, the cutter 16 can be employed for producing entire spaces between teeth.

Figure 6:
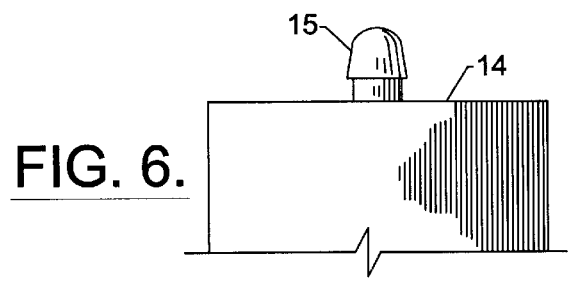
FIG. 6 is a sectional side view of a milling cutter having a size and form approximately equal to a space between gear teeth for use on the FIG. 3 machine.

The milling cutter 15 illustrated in FIG. 3 can have a cross-sectional form that approximates a design space between teeth as shown in FIG. 6. Alternatively for the milling cutter 15 also, its shape can be designed for partial or rough cuts separately from finish cuts. Further, the milling cutter 15 can have rough-cut teeth for cutting all or parts of spaces between gear teeth prior to finish-cutting with a smooth-cut finishing milling cutter 15.

Figure 7:
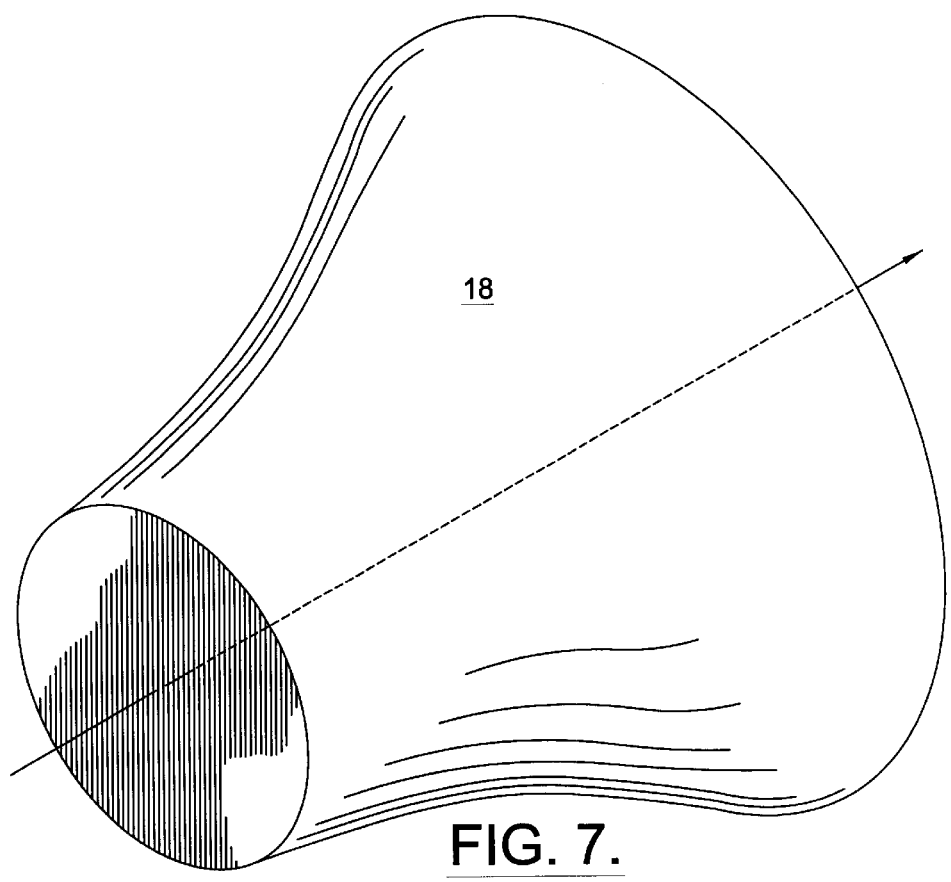
FIG. 7 is a perspective view of a hyperboloidal form that approximates a shape of an optimized gear body that can be manufactured with this invention.

Referring to FIG. 7, optimized gear bodies having a hyperboloidal or variable diameter forms can be cut from a gear blank 18. Conjugate action can be achieved more completely in variations of this form than in any form now possible with present hobbing and machining equipment and related methods.

Figure 8:
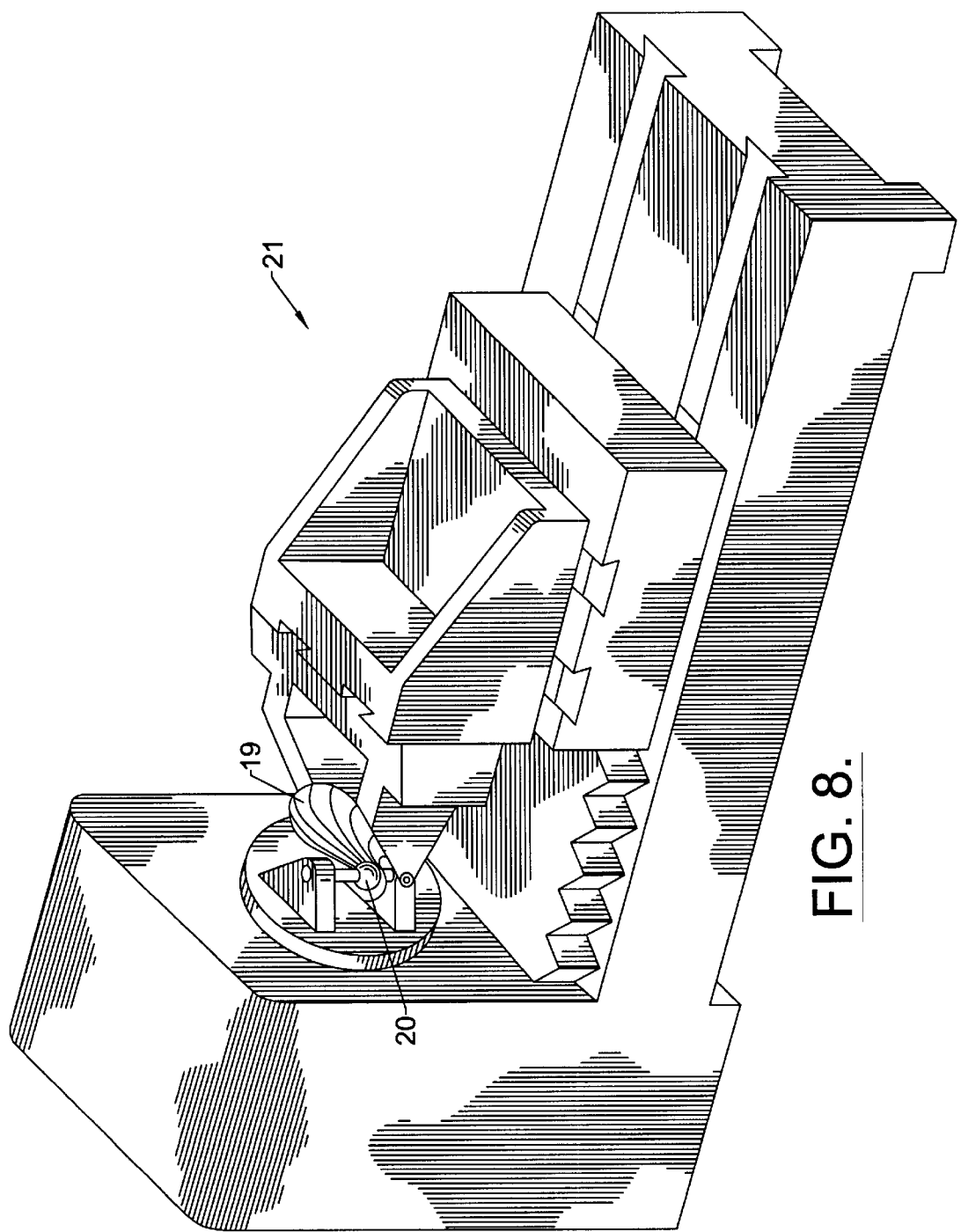
FIG. 8 is a perspective view of an optimized gear cutter in cutting relationship to a gear in a gear-cutting machine.

Referring to FIG. 8, a gear-cutting tool 19 constructed in accordance with this invention can be positioned in gear-cutting relationship to a workpiece from which a design gear form 20 can be cut in a gear-cutting machine 21.

Figure 9:
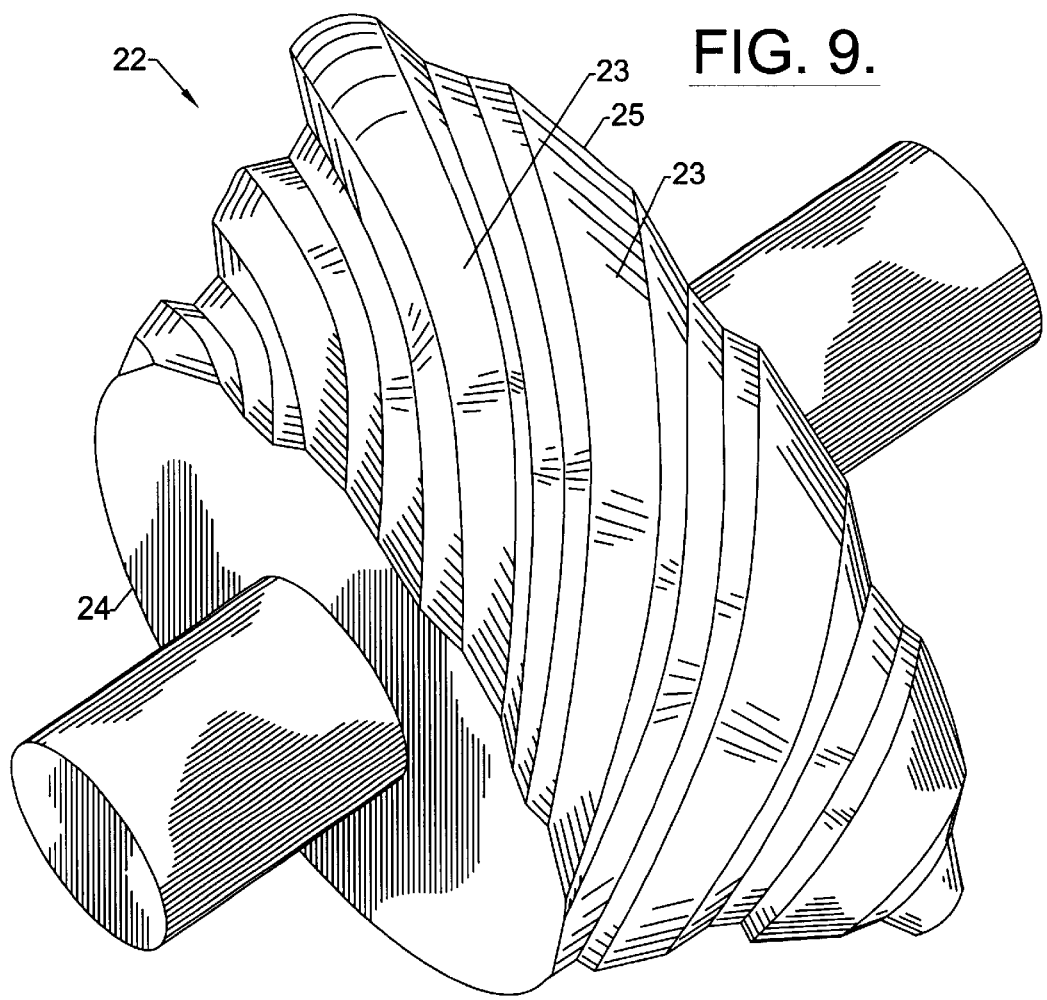
FIG. 9 is a perspective view of a form for an optimized gear-cutting tool for cutting a first hyperboloidal gear.
Figure 10:
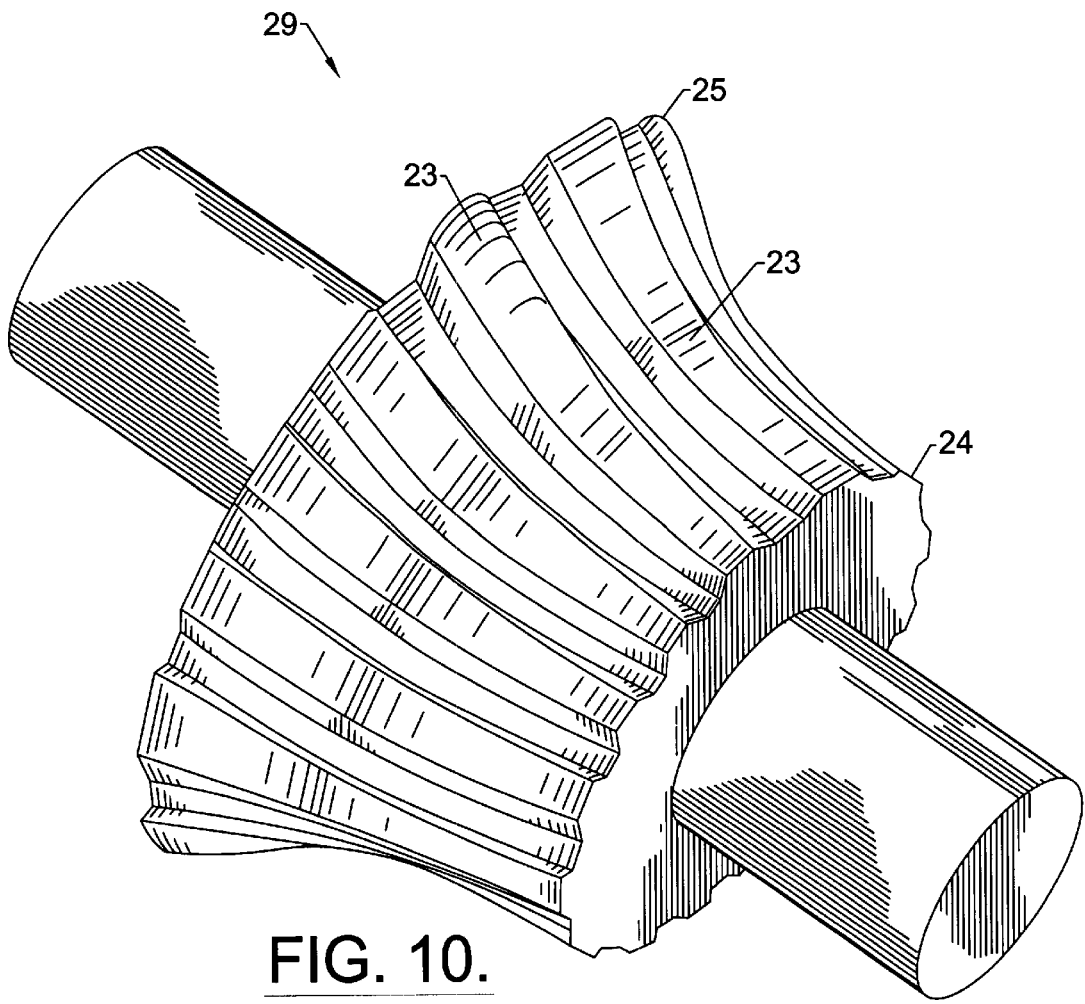
FIG. 10 is a perspective view of a form for an optimized gear-cutting tool for cutting a second hyperboloidal gear.
Figure 11:
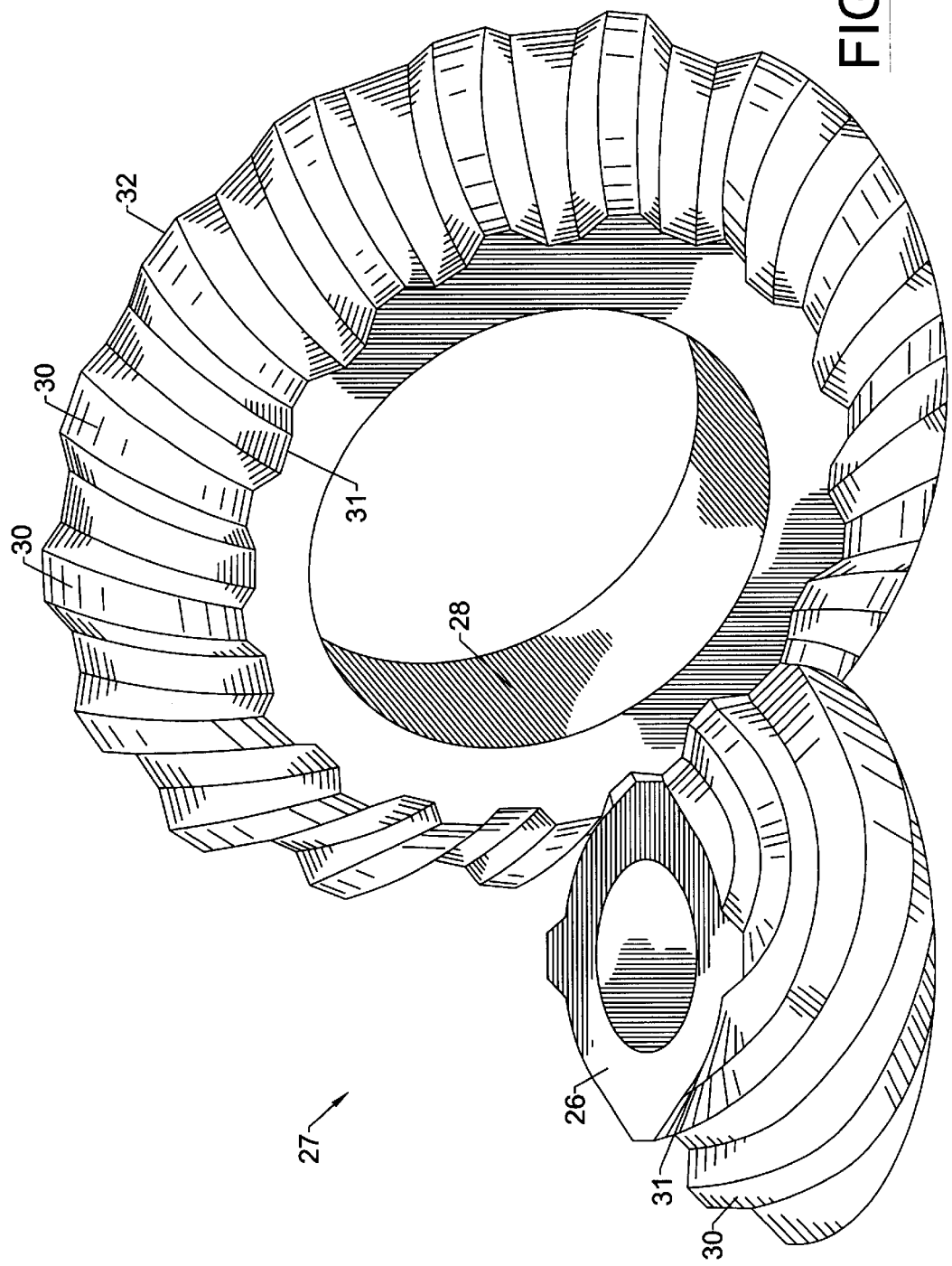
FIG. 11 is a perspective view of a hyperboloidal gear set constructed in accordance with this invention.

Referring to FIGS. 9–11, a first hyperboloidal gear-cutting tool 22, shown in FIG. 9, is typical of gear-cutting tools that can be structured in accordance with this invention. It has gear-cutter teeth 23 that curve outward radially and axial while increasing in width intermediate a minor outside diameter 24 and a major outside diameter 25. This is a form of gear cutter or gear with a completeness of conjugate action that is not possible to construct or to be used economically with conventional machinery and methods. As a hyperboloidal gear-cutting tool 22, in contrast to a gear wheel, it is employed to cut a first gear 26 in a gear set 27 shown in FIG. 11. A second gear 28 shown in FIG. 11 is cut by a second hyperboloidal gear-cutting tool 29 shown in FIG. 10. The second hyperboloidal gear-cutting tool 29 also has gear-cutter teeth 23 that curve outward radially and axial while increasing in width intermediate a minor outside diameter 24 and a major outside diameter 25.

As on the hyperboloidal gear-cutting tools 22 and 29, gear teeth 30 curve outward radially and axial while increasing in width intermediate a gearwheel minor outside diameter 31 and a gear-wheel major outside diameter 32 on both gear wheels 26 and 28. These forms of gear teeth geometry 30 and gear-cutter teeth 23 are only examples of forms made possible and economical with this invention. A wide variety of gear teeth and gear-cutter teeth are foreseeable for all types and sizes of gears.

Figure 12:
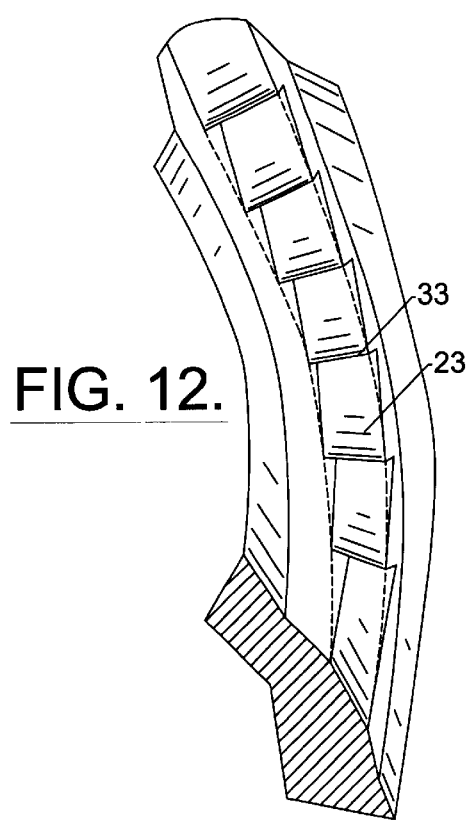
FIG. 12 is a sectional perspective view of optional cutting edges on gear-cutter teeth on the FIG. 9 and FIG. 10 gear-cutting tools.
Figure 13:
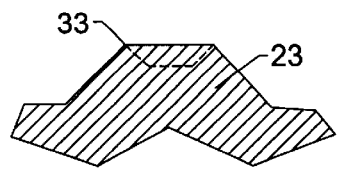
FIG. 13 is a cross-sectional view of a tooth of either a gear-cutter tool or a gear wheel.
Figure 14:
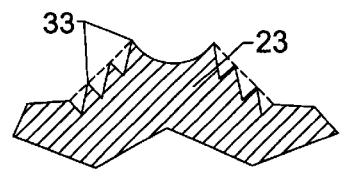
FIG. 14 is a cross-sectional view of a tooth of a gear-cutter tool having optional positive-rake cutting edges.
Figure 15:
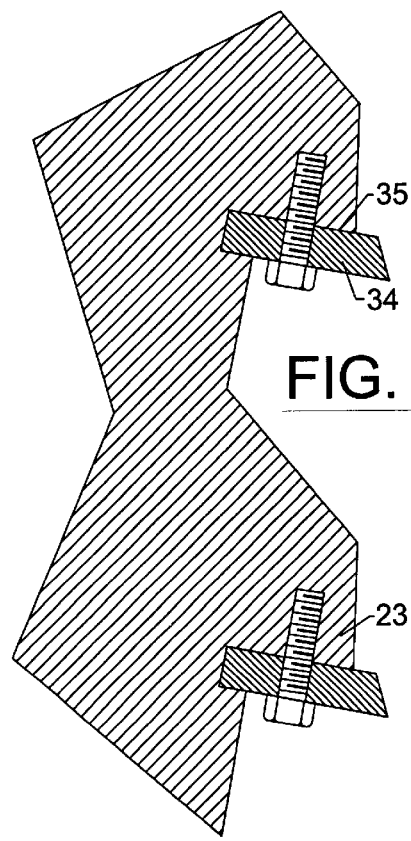
FIG. 15 is a cross-sectional view of a portion of a gear-cutter tool having cutting inserts.
Figure 16:
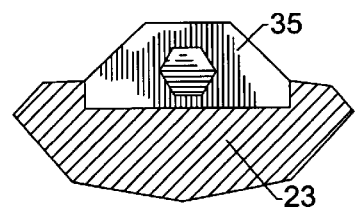
FIG. 16 is a sectional front view of the cutting insert illustrated in FIG. 14 in relation to a gear-cutter tool.

Reference is made now to FIGS. 12–16. As depicted in FIG. 12, cutting edges 33 can be formed in across-tooth relationship on the gear-cutter teeth 23 of either the first hyperboloidal gear-cutting tool 22 or the second hyperboloidal gear-cutting tool 29, described in relation to FIGS. 9–10, for some forms of gear cutters. Alternatively for other forms of gear cutters, cutting edges 33 can be formed on curved surfaces and edges of gear-cutter teeth 23 as shown in FIGS. 13–14. Optionally also for some types of gear cutters, cutting inserts 34 can be attached to lead surfaces 35 on gear-cutter teeth 23 as illustrated in FIGS. 15–16. As for the cross-sectional cutter 16 described in relation to FIG. 4 and the point cutter 17 described in relation to FIG. 5, the cutting edges 33 and the cutting inserts 34 can have either cross-sectional or point forms for various types of gear cutters. A wide variety of cutting edges 33 and cutting inserts 34 are foreseeable for a wide variety of cutter tools in accordance with this invention.

A new and useful gear-manufacturing method and machine having been described, all such modifications, adaptations, substitutions of equivalents, combinations of parts, applications and forms thereof as described by the following claims are included in this invention.

What is claimed is:

1. A method for manufacturing a toothed gear pair, each toothed gear having a variable diameter and variable pitch for providing a conjugate action therebetween, the method comprising the steps of:

providing at least one numerically controlled milling machine having a frame, a machine spindle having selectively controllable rotation for rotatably carrying a workpiece to be machined, a carriage moveably carried by the frame for rotation and reciprocation thereof with simultaneous rotation of the workpiece, and a cutter carried by the carriage for cutting the workpiece in response to a preselected control input;

providing at least one preselected control input to the numerically controlled milling machine, which input includes cutter movement commands for providing a conjugate movement between toothed gears of a toothed gear pair to be manufactured;

mounting a first variable diameter shaped workpiece on the machine spindle of the at least one milling machine for rotation about an axis thereof, the first variable diameter shaped workpiece having a minor diameter end and an axially opposing major diameter end;

cutting at least one groove into the first variable diameter shaped workpiece by reciprocating and rotating the cutter, while simultaneously rotating the first variable diameter shaped workpiece about the axis in response to the preselected control input for providing a groove which extends along the surface of the first variable diameter shaped workpiece between the minor and major diameter ends;

rotating the first variable diameter shaped workpiece about the axis by one circular pitch, in response to the at least one preselected control input for providing a preselected number of teeth;

repeating the groove cutting and rotating steps for forming a first variable diameter gear-forming tool having the preselected number of teeth positioned between the grooves cut therein and extending from the minor to the major diameter ends thereof, each of the preselected number of teeth having a forming edge thereon, each of the preselected number of teeth curved radially and axially outward while changing in pitch from the minor diameter end to the major diameter end;

cutting at least one groove into a second variable diameter shaped workpiece having a minor diameter end and axially opposing major diameter end by reciprocating and rotating the cutter, while simultaneously rotating the second variable diameter shaped workpiece about an axis thereof in response to the preselected control input for providing a east one groove which extends along the surface of the second variable diameter shaped workpiece between the minor and major diameter ends thereof;

rotating the second variable diameter shaped workpiece about the axis by one circular pitch in response to the preselected control input for providing a preselected number of teeth;

repeating the groove cutting and rotating steps for forming a second variable diameter gear-forming tool having the preselected number of teeth positioned between the grooves cut therein and extending from the minor to the major ends thereof, each of the preselected number of teeth having a forming edge thereon, each of the preselected number of teeth curved radially and axially outward while changing in pitch from the minor diameter end to the major diameter end, the first and second variable diameter gear-forming tools resulting from the preselected control input for forming a variable diameter gear cutting pair operable in a gear forming machine for forming a variable diameter toothed gear pair;

positioning the first variable diameter gear-forming tool on at least one gear-forming machine in a gear forming relationship to a third variable diameter shaped workpiece, from which third variable diameter shaped workpiece a first variable diameter toothed gear of the toothed gear pair is to be formed;

forming the first variable diameter toothed gear;

positioning the second variable diameter gear-forming tool on the at least one gear-forming machine in a gear forming relationship to a fourth variable diameter shaped workpiece, from which fourth variable diameter shaped workpiece a second variable diameter toothed gear of the toothed gear pair is to be formed; and forming the second variable diameter toothed gear, and thus the toothed gear pair, wherein each gear of the toothed gear pair has a variable diameter and variable pitch for providing a conjugate action therebetween.

2. The method according to claim 1, wherein the first, second, third, and fourth variable shaped workpieces comprise hyperboloidal shapes for providing a hyperboloidal toothed gear pair.

3. The method according to claim 1, wherein the first and second gear-forming tools comprise first and second gear-cutting tools, and wherein the steps of forming the first and second variable diameter toothed gears comprise the steps of cutting the first and second variable diameter toothed gears.

4. The method according to claim 1, wherein the preselected number of teeth comprises a single tooth.

5. The method according to claim 1, wherein the numerically controlled milling machine comprises a computer controlled machine.

6. The method according to claim 1, wherein the gear-forming machine comprises a hobbing machine.

7. The method according to claim 1, wherein the workpiece mounting steps comprise the step of coaxially aligning axes of the workpiece and the spindle.

8. The method according to claim 1, wherein the groove cutting steps comprise the steps of:

positioning a cutting mill on a rotative spindle and extending the rotative spindle cutting perpendicularly from the carriage;

rotating the cutting mill while simultaneously rotating and reciprocating the carriage in a cutting relationship to the workpiece; and rotating the machine spindle while varying distance intermediate the machine spindle and the cutting mill, and varying distance relationship between the carriage and the machine spindle until a groove is cut.

9. A method for manufacturing a variable diameter, toothed gear pair, the method comprising the steps of:

providing at least one preselected control input to at least one numerically controlled milling machine, said milling machine having a cutter, which input includes cutter movement commands for providing a conjugate movement between toothed gears of a toothed gear pair to be manufactured;

mounting a first variable diameter shaped workpiece on a machine spindle of the at least one milling machine for rotation about an axis of the variable diameter workpiece;

forming a first variable diameter gear-forming tool by cutting at least one groove into the first variable diameter shaped workpiece by reciprocating and rotating the cutter, while simultaneously rotating the first variable diameter shaped workpiece about the axis in response to the preselected control input for providing the at least one groove therein;

mounting a second variable diameter shaped workpiece on the machine spindle of the at least one milling machine for rotation about an axis of the second variable diameter shaped workpiece;

forming a second variable diameter gear-forming tool by cutting at least one groove into the second variable diameter shaped workpiece by reciprocating and rotating the cutter, while simultaneously rotating the first variable diameter shaped workpiece about the axis thereof in response to the at least one preselected control input for providing the at least one groove therein;

positioning the first variable diameter gear-forming tool on at least one gear-forming machine in a gear forming relationship to a third variable diameter shaped workpiece, from which third variable diameter shaped workplece a first variable diameter toothed gear of the toothed gear pair is to be formed;

forming the first variable diameter toothed gear;

positioning the second variable diameter gear-forming tool on the at least one gear-forming machine in a gear forming relationship to a fourth variable diameter shaped workpiece, from which fourth variable diameter shaped workpiece a second variable diameter toothed gear of the toothed gear pair is to be formed; and forming the second variable diameter toothed gear, and thus the toothed gear pair.

10. The method according to claim 9, wherein the first, second, third, and fourth variable shaped workpieces comprise hyperboloidal shapes for providing a hyperboloidal toothed gear pair.

11. The method according to claim 9, wherein the first and second gear-forming tools comprise first and second gear-cutting tools, and wherein the steps of forming the first and second variable diameter toothed gears comprise the steps of cutting the first and second variable diameter toothed gears.

12. The method according to claim 9, wherein the gear-forming machine comprises a hobbing machine.

13. The method according to claim 9, wherein the groove cutting steps comprise the steps of:

positioning a cutting mill on a rotative spindle operable with the machine spindle;

rotating the cutting mill while simultaneously rotating and reciprocating the cutting mill in a cutting relationship to the workpiece; and rotating the machine spindle while varying distance intermediate the machine spindle and the cutting mill, and varying distance relationship between the carriage and the machine spindle until a groove is cut.

14. The method according to claim 9, wherein the at least one groove formed within the first and the second variable diameter gear-forming tools forms at least one tooth which curves radially and axially outward while increasing in width between a minor diameter and a major diameter.

* * * * *